United States Patent
Haase et al.

(10) Patent No.: US 6,915,703 B2
(45) Date of Patent: Jul. 12, 2005

(54) CAPACITANCE METER

(75) Inventors: Mark Christopher Haase, Rijswijk (NL); Alexander Michael Van Der Spek, Rijswijk (NL)

(73) Assignee: Shell Oil Company, Houston, TX (US)

( * ) Notice: Subject to any disclaimer, the term of this patent is extended or adjusted under 35 U.S.C. 154(b) by 20 days.

(21) Appl. No.: 10/220,355

(22) PCT Filed: Mar. 2, 2001

(86) PCT No.: PCT/EP01/02451

§ 371 (c)(1),
(2), (4) Date: Aug. 30, 2002

(87) PCT Pub. No.: WO01/65212

PCT Pub. Date: Sep. 7, 2001

(65) Prior Publication Data

US 2003/0020493 A1 Jan. 30, 2003

(30) Foreign Application Priority Data

Mar. 3, 2000 (EP) .......................... 00200765

(51) Int. Cl.$^7$ .............................. G01F 1/86
(52) U.S. Cl. ................................ 73/861.02
(58) Field of Search ................. 73/861.04, 861.03, 73/861.06, 861.02

(56) References Cited

U.S. PATENT DOCUMENTS

| 4,063,153 | A |   | 12/1977 | Dechene et al. |           |
|-----------|---|---|---------|----------------|-----------|
| 4,228,353 | A |   | 10/1980 | Johnson        |           |
| 4,566,317 | A | * | 1/1986  | Shakra         | 73/152.35 |
| 4,604,904 | A | * | 8/1986  | Massen         | 73/861.06 |
| 5,046,369 | A | * | 9/1991  | Boyd et al.    | 73/861.03 |
| 5,396,806 | A |   | 3/1995  | Day et al.     |           |
| 5,929,342 | A | * | 7/1999  | Thompson       | 73/861.04 |

FOREIGN PATENT DOCUMENTS

| DE | 92/04 374 | 8/1993 | ............ G01F/1/56 |
| EP | 0 372 598 | 6/1990 | ........... E21B/47/00 |
| EP | 0 326 266 | 7/1992 | ............ G01F/1/64 |
| EP | 0 947 810 | 6/1999 | ............ G01F/1/74 |

OTHER PUBLICATIONS

R. Thorn. et al. in Flow Meas. Instrum., vol. 1, Oct. 1990, pp. 259–268, "Flow Imaging for Multi–Component Flow Measurement".

Imaging Industrial Flows: "Applications of Electrical Process Tomography" by A. Plaskowski, M.S. Beck, R. Thorn and T. Dyakowski. IOP Publishing, 1995 p. 197.

* cited by examiner

Primary Examiner—Edward Lefkowitz
Assistant Examiner—Jewel V. Thompson

(57) ABSTRACT

A method for determining a flow property of a fluid flowing through a conduit provided with a capacitance meter having an upstream and a downstream annular capacitance sensor, wherein each annular capacitance sensor having at least three sensor electrodes, which sensor electrodes are arranged around the circumference of the conduit, the method having selecting, for each annular capacitance sensor a set of measurement capacitors, wherein a measurement capacitor is formed by two measurement electrodes, and wherein a measurement electrode consists either of a single sensor electrode or of at least two interconnected sensor electrodes; measuring at several moments during a time interval a capacitance of each measurement capacitor of each annular capacitance sensor; determining cross correlations between capacitances measured during the time interval at the upstream annular capacitance sensor and capacitances measured during the time interval at the downstream annular capacitance sensor; and determining the flow property from the cross correlations.

14 Claims, 1 Drawing Sheet

CAPACITANCE METER

FIELD OF THE INVENTION

The present invention relates to determining a property of a fluid in a conduit using a capacitance meter.

BACKGROUND OF THE INVENTION

Capacitance meters are used in the art to measure a dielectric property of a fluid. Often, based on one or more measurements of a dielectric property, another property of the fluid can be determined.

A particular application of capacitance meters is in obtaining a pictorial representation of a property of a fluid over a cross-section of the conduit, e.g. the dielectric constant or the spatial distribution of a particular component of a multi-component fluid. In the specification the word 'image' is used to refer to such a pictorial representation. A multi-component fluid is a fluid comprising more than one component, for example a well fluid produced from an underground formation, which well fluid can comprise hydrocarbon oil, water, and/or natural gas.

Methods that provide an image of the fluid based on capacitance measurements using a capacitance meter are often referred to as capacitance tomography. Well known in the art are methods for calculating an image from the capacitances measured by the capacitance meter, for example linear back projection wherein the image is calculated by a series of linear operations on the capacitances.

A capacitance meter for capacitance tomography is disclosed in European patent specification with publication No. 0 326 266 B1. The known capacitance meter comprises an annular capacitance sensor arranged around a conduit. The capacitance sensor comprises eight sensor electrodes, which are arranged around the circumference of the conduit. Capacitances between any two single sensor electrodes are measured, wherein each capacitance measurement samples an average dielectric constant in the space probed by the respective electrodes. From the measurements an image consisting of K pixels can be constructed, wherein a pixel represents an average value of the dielectric constant in a discrete space element in the cross-section, the pixel data. Such an image can be transformed into a concentration image or a density image.

If the fluid is flowing through the conduit, it is often highly desirable obtain measurements of a flow property in addition to an image. In a publication by R. Thorn et al. in Flow Meas. Instrum. Vol. 1, October 1990, pages 259–268, it has been disclosed, how a flow velocity profile of the fluid can be obtained. To this end, the capacitance meter comprises two annular capacitance sensors located upstream and downstream along the conduit. Using each annular capacitance sensor, images $P_u$ and $P_d$ are determined repeatedly during a time interval. The flow velocity profile is determined from cross correlations of pixel data $P_{u,k}$ of images determined during the time interval at the upstream sensor with pixel data $P_{d,l}$ determined during the time interval at the downstream sensor. The cross correlation of pixel data, in the form of numbers representing for example density, can be described by $$(P_{u,k} * P_{d,l})(t) = \frac{1}{T}\int_0^T P_{d,l}(s)P_{u,k}(t-s)\,ds$$

wherein k,l are integers, wherein $1 \leq k, l \leq K$ and K is the number of pixels in an image;

$(P_{u,k} * P_{d,l})(t)$ is the cross correlation of pixel data at a selected time t;

$P_{u,k}(t-s)$ is the number associated with pixel k of an image provided by the upstream sensor at time (t−s);

$P_{d,l}(s)$ is the number associated with pixel l of an image provided by the downstream sensor at time s; and T is the duration of a correlation time window during the time interval.

Note, that this and other equations in this specification relating to cross-correlation calculations are written in integral form; it will however be clear to the skilled person how to calculate cross correlations using discrete measurements.

The method described in the publication is referred to as cross-correlation capacitance tomography. If the fluid is a multi-component fluid, other flow properties such as the volumetric or mass flow rates of a particular component can be determined from a concentration or density image and a flow velocity profile.

There are, however, a number of problems associated with capacitance flow meters, that have so far hampered their practical application in an industrial environment. For example, specific requirements for applications in the oil industry, where the flow of a multi-component fluid is to be monitored, have not yet been met. One requirement relates to the speed of operation. For cross-correlation capacitance tomography, processing of large amounts of data is required.

Consider the case that both the upstream and the downstream capacitance sensors contain N sensor electrodes. In known sensors N is typically in the order of 8 to 12. A complete data set of capacitances measured between all pairs of single sensor electrodes at a single annular capacitance sensor consists of in the order of $N^2$ measured capacitances (more precise $N(N-1)/2$ capacitances). From this data set an image is calculated consisting of in the order of $(N^2)^2 = N^4$ pixels. To determine a complete flow velocity profile, a large number of images need to be determined during a time interval at both capacitance sensors, and all possible cross correlations between pixel data of each image plane must be calculated. This task requires then in the order of $N^8$ cross-correlation operations. This presents an immense computational challenge requiring high-performance data-processing devices, e.g. special purpose devices such as a parallel-processor. Thus, in the absence of a far more efficient method for processing the data, the need for high-performance data-processing devices will impede the practical application in an industrial environment.

U.S. Pat. No. 5,396,806 discloses a method and apparatus for determining the mass-flow rate of a component in a two-component slurry mixture. The mass-flow rate is determined as the product of volume fraction of the component and overall flow velocity. The volume fraction is derived from the capacitance of the mixture, which capacitance is measured using a single annular capacitance sensor comprising a number of electrodes. Measurements using different pairs of electrodes are averaged in order to reduce the effects of non-uniformities of the flow patterns. The flow velocity is derived from triboelectric measurements, by cross-correlation of signals measured by an upstream and a downstream triboelectric probe.

It is an object of the present invention to provide an efficient method and capacitance meter for determining a flow property of a fluid flowing through a conduit by using capacitance flow meter.

SUMMARY OF THE INVENTION

A basis of the present invention is the insight gained by Applicant, that the efficiency of determining a flow velocity profile is strongly determined by the number of cross-correlation calculations that are necessary in cross-correlation capacitance tomography.

Applicant now has found that and how a considerable reduction of the number of cross-correlation calculations compared to the known methods can be achieved.

According to one aspect of the present invention there is provided a method for determining a flow property of a fluid flowing through a conduit provided with a capacitance meter comprising an annular capacitance sensor, wherein the annular capacitance sensor comprises at least three sensor electrodes, which sensor electrodes are arranged around the circumference of the conduit, the method comprising the steps of:

(a) selecting, for the annular capacitance sensor, a set of measurement capacitors, wherein a measurement capacitor is formed by two measurement electrodes, and wherein a measurement electrode consists either of a single sensor electrode or of at least two interconnected sensor electrodes;

(b) measuring a capacitance of each measurement capacitor, characterized in that the annular capacitance sensor forms an upstream annular capacitance sensor, and in that the capacitance meter further comprises a downstream annular capacitance sensor provided with at least three sensor electrodes, which sensor electrodes are arranged around the circumference of the conduit, wherein the method further comprises the steps of (c) selecting, for the downstream annular capacitance sensor, a set of measurement capacitors;

(d) measuring at several moments during a time interval a capacitance of each measurement capacitor of each annular capacitance sensor;

(e) determining cross correlations between capacitances measured during the time interval at the upstream annular capacitance sensor and capacitances measured during the time interval at the downstream annular capacitance sensor; and (f) determining the flow property from the cross correlations.

In this method according to the present invention first cross correlations between capacitances measured at an upstream sensor and capacitances measured at a downstream sensor during a time interval are calculated, and the flow property (e.g. a flow velocity profile) is subsequently determined from these cross correlations. If for the determination of the flow property cross correlations between pixel data are needed, these cross correlations can be determined by linear operation on the cross correlations between capacitances, wherein use is made of a linear image calculation method. Accordingly, to determine the complete flow velocity profile, only in the order of $(N^2)^2=N^4$ cross correlations need be determined, rather than $N^8$ cross correlations as in the known method by Thorn et al. Since the calculation of cross correlations is by far the most time-consuming processing step, this aspect of the present invention results in an enormous improvement of processing efficiency and a much increased speed of operation.

For the sake of completeness, reference is made to the book 'Imaging Industrial Flows: Applications of Electrical Process Tomography' by A. Plaskowski, M. S. Beck, R. Thorn and T. Dyakowski, IOP Publishing, 1995. With reference to future developments in flow velocity imaging, on page 197 of the book the following imprecise statement is made: 'Basic research will be focused on: Considering the relative merits of cross correlation of tomographic view data sometimes followed by reconstruction, compared with cross correlation of reconstructed image pixel data'. However, the book does not disclose how that is done in practice.

Further it is noted, that there are many other methods known to determine a flow property, and in relation to the present invention one such method is discussed in detail. Reference is made to U.S. Pat. No. 4,228,353, which publication relates to methods for determining a mass-flow rate of a fluid. However, these methods rely on cross-correlation X-ray tomography, in contrast to the present invention wherein a capacitance meter is used. The methods as described in the USA patent publication comprise the determination of density images and flow velocity profiles.

In X-ray tomography, a transmitted X-ray intensity is measured along various well-defined ray paths. The first processing step of the methods according to the USA patent publication is to calculate an average density along a ray path from the measured transmitted X-ray intensity. For the subsequent determination of a flow velocity profile, two methods are considered:

(i) first calculating density images from the average densities, followed by cross correlation of pixel data; and (ii) first calculating cross correlations of average densities, which are used in the calculation of cross correlations of pixel data.

Therefore, both methods differ from the method of the present invention.

The present invention further relates to calibrating a capacitance meter. A useful calibration method will improve the robustness of operating a capacitance meter in practice. Under operating conditions, environmental influences act upon the annular capacitance sensor and may influence the measurements; examples of such environmental influences are temperature changes, pressure changes, external forces, changes in the electrode arrangement, deposition of materials on the electrodes or in the space probed by the annular capacitance sensor. Capacitance measurements, in particular for cross-correlation capacitance tomography, have to be performed with sufficient precision in order to provide useful data. Therefore a method is needed that allows correcting for environmental influences by an efficient calibration of the capacitance meter. Applicant has found that and how a relationship between capacitances measured by an annular capacitance sensor can be utilised in a new method for correcting measured capacitances.

If the conduit inside an annular capacitance sensor is filled with a calibration fluid having a known dielectric property, say having the dielectric constant $\in$, then calibration capacitances can be measured between pairs of sensor electrodes of the annular capacitance sensor. if the calibration measurements are repeated after some time using a calibration fluid having the same dielectric property, in general a change in measured calibration capacitances will be noticed, due to environmental influences.

During normal operation of an annular capacitance sensor, however, it will be filled with a test fluid having an unknown dielectric property, and it is the purpose of the capacitance sensor to determine the unknown dielectric property by measuring test capacitances. Therefore, it will be clear that a method for correcting the measured test capacitances is needed in order to account for the effect of environmental influences.

Thus, furthermore is provided a new method for providing corrected capacitances using an annular capacitance sensor for determining a dielectric property of a test fluid in a conduit, which capacitance sensor comprises at least four sensor electrodes arranged around the circumference of the conduit, the method comprising the steps of:

filling the conduit with the test fluid;

selecting a set of measurement capacitors, wherein a measurement capacitor is formed by two measurement electrodes, and wherein a measurement electrode consists either of a single sensor electrode or of at least two interconnected sensor electrodes;

measuring a test capacitance of each measurement capacitor; wherein the method further comprises the steps of interrupting the measurement at certain moments in time;

filling the conduit with a calibration fluid having a known dielectric property;

selecting a set of calibration capacitors, wherein a calibration capacitor is formed by two calibration electrodes, and wherein a calibration electrode consists either of a single sensor electrode or of at least two interconnected sensor electrodes;

measuring a calibration capacitance of each calibration capacitor; and determining corrected capacitances from the test capacitances and the calibration capacitances by using a relationship between the calibration capacitances and the known electric property of the calibration fluid.

Reference is made to the article by D. G. Lampard and R. D. Cutkosky in Proc. Instr. of Electrical Engineers part C, vol. 196C, The Institute of Electrical Engineers, Monograph No. 351 M, January 1960. In this article, a theorem in electrostatics is discussed, which in the following will be referred to as the Thompson-Lampard theorem.

The Thompson-Lampard theorem relates to a conducting cylindrical shell, which is subdivided into four mutually isolated electrodes by narrow gaps parallel to the axis of the cylindrical shell. If the cylindrical shell is filled with a material having a known dielectric constant $\in$, the following relationship holds:

$$e^{-\pi C_1/\in} + e^{-\pi C_2/\in} = 1$$

wherein $C_1$ is the capacitance per unit length of a capacitor formed by two non-neighbouring electrodes;

$C_2$ is the capacitance per unit length of a capacitor formed by the two remaining electrodes; and $\in$ is the dielectric constant, which for a homogeneous material is the product of the dielectric constant of the vacuum $\in_0$, and a relative dielectric constant $\in_r$ that is a property of the material.

The Thompson-Lampard theorem provides a relationship between the known dielectric property of a material, e.g. a calibration fluid, and measured calibration capacitances. The Thompson-Lampard theorem thereby provides the basis for the method of the present invention for providing corrected capacitances for a test fluid. In practice, a modification of the Thompson-Lampard theorem may be needed, in order to account for specifics of the practical situation, e.g. dimensions of electrode gaps, the presence of other dielectric materials than the calibration fluid, such as a conduit wall, in the vicinity of the sensor electrodes.

For example, a generalised form of the Thompson-Lampard theorem is $$e^{-\pi C_1/\in} + e^{-\pi C_2/\in} = c,$$

wherein the constant c equals 1 under ideal circumstances, but may deviate from 1 in a practical situation. The deviation from ideality can in part be caused by the electrode arrangement in a practical annular capacitance sensor (e.g. size of gaps between electrodes, length of the electrodes, the presence of guard electrodes, electric screens or dielectric materials in the vicinity of the electrodes), and in part by environmental influences. If necessary, deviations due to electrode arrangement can be estimated, or accounted for by comparison with measurements in which other environmental influences have been excluded, e.g. factory calibration measurements.

The present invention will now be described by way of example in more detail with reference to the drawings, wherein

DETAILED DESCRIPTION OF THE INVENTION

Figure 1:
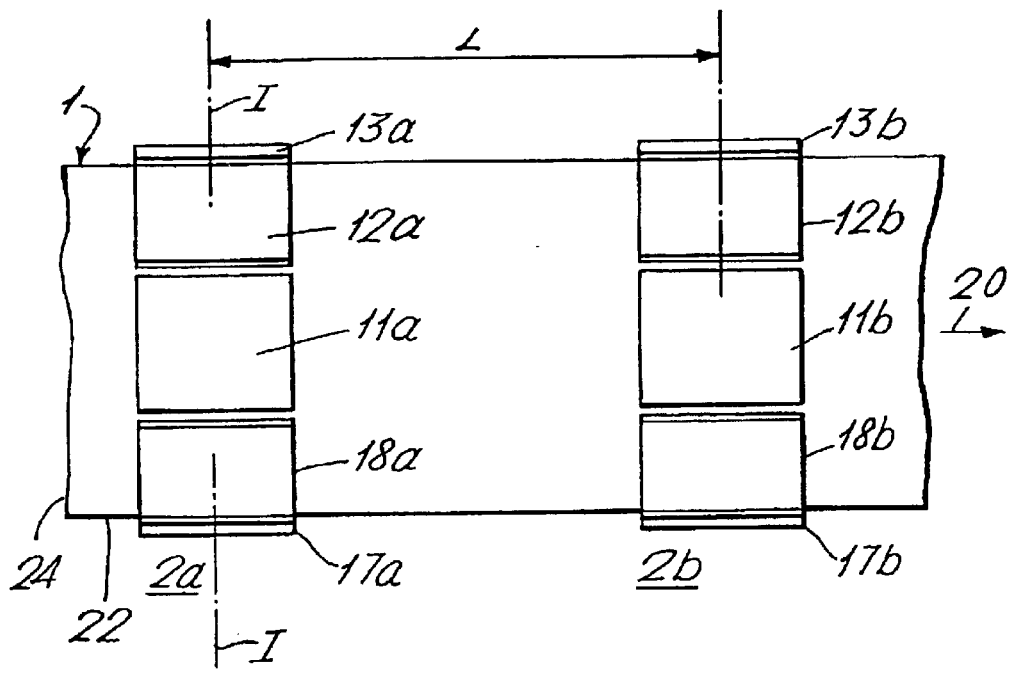
FIG. 1 shows schematically a side view of a conduit provided with a capacitance meter comprising two annular capacitance sensors in accordance with the present invention.
Figure 2:
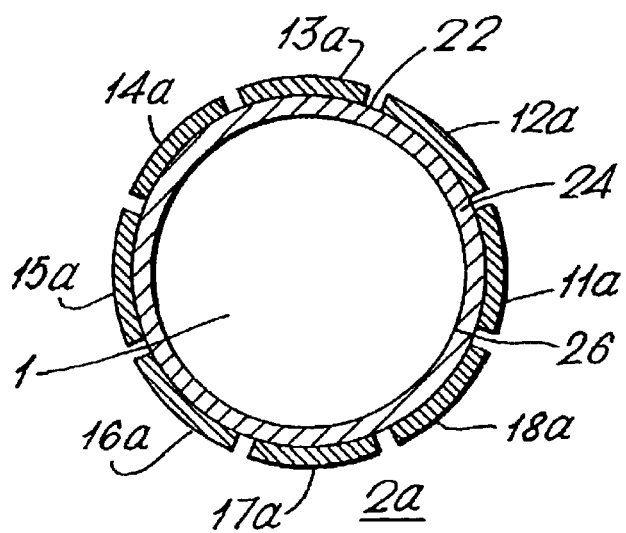
FIG. 2 shows, on a different scale than FIG. 1, schematically a cross-section of the conduit of FIG. 1 along the line I—I.

Reference is now made to FIGS. 1 and 2. The conduit 1 is provided with upstream and downstream annular capacitance sensors, 2a and 2b, separated by the distance L. Each annular capacitance sensor in this example comprises eight electrodes, 11a, ..., 18a and 11b, ..., 18 b, which are uniformly distributed around the circumference of the conduit 1.

Normal operation of the cross-correlation capacitance meter as schematically depicted in FIGS. 1 and 2, will now be described, wherein a multi-component fluid is flowing through the conduit 1 in the direction of the arrow 20.

At first, a set of measurement capacitors is selected. In this example, a measurement capacitor is formed by a pair of single sensor electrodes, and all 8*(8−1)/2=28 possible pairs of single sensor electrodes at the upstream sensor are selected, i.e. the pairs (11a, 12a); (11a, 13a); ...; (11a, 18a); (12a, 13a); ...; (12a, 18a); ...; (17a, 18a), as well as all 28 pairs of single sensor electrodes at the downstream sensor, i.e. the pairs (11b, 12b); (11b, 13b); ...; (11b, 18b); (12b, 13b); ...; (12b, 18b); ...; (17b, 18b). In this way, a single sensor electrode forms part of a number of measurement capacitors.

Next, a time interval is selected, and the capacitance of each of the selected measurement capacitors is measured at different moments during the time interval. Every capacitance measurement is probing the dielectric properties of the fluid that is flowing at that moment in the space probed by the respective pair of electrodes. E.g. the capacitance of the pair (11a, 12a) is measured at several moments in time during the interval. It may be desirable to measure more than one capacitance at the same moment in time, for example the capacitance of all measurement capacitors that include a particular sensor electrode such as (11a, 12a); (11a, 13a); (11a, 14a); ...; (11a, 18a).

The capacitances measured at the upstream sensor at a certain time are denoted by $C_{u,i}(t')$, and the capacitances measured at the downstream sensor are denoted by $C_{d,j}(t')$; (i,j=1, ..., 28; and t' is a time in the time interval), wherein i and j refer to the respective pair of electrodes at the upstream and downstream sensors.

Next, cross correlations between capacitances measured during the time interval at the upstream sensor, and capacitances measured during the time interval at the downstream sensor are determined. To this end a time window of duration T in the time interval is selected, and then the cross correlation between the capacitances is calculated using:

$$(C_{u,i} * C_{d,j})(t) = \frac{1}{T}\int_0^T C_{d,j}(s) C_{u,i}(t-s) ds$$

wherein $(C_{u,i} * C_{d,j})(t)$ is the cross correlation between capacitances at a selected time t, s and (t−s) denote times in the time interval, and the other symbols have the same meaning as given before.

The capacitance cross correlations form the basis for determining a flow property of the fluid. In addition, the measured capacitances can be used to calculate an image. To this end a linear method for calculating the image the such as linear back projection is used. Accordingly, pixel data $P_{u,k}$ and $P_{d,l}$ (k,l=1, . . . , K) for images provided by the upstream and downstream sensor are calculated from the capacitances $C_{u,i}$ and $C_{d,j}$ (i,j=1, . . . , 28), respectively, by linear operations which can be expressed by the following equations:

$$P_{u,k}(t') = \sum_{i=1}^{28} a_{ki} C_{u,i}(t') \quad P_{d,l}(t') = \sum_{j=1}^{28} b_{lj} C_{d,j}(t')$$

wherein k,l=1, . . . , K;

$a_{ki}$ are elements of a time-independent coefficient matrix for calculating pixel data from capacitances at the upstream sensor; and $b_{lj}$ are elements of a time-independent coefficient matrix for calculating pixel data from capacitances at the downstream sensor.

Further in accordance with the present invention, cross correlations of pixel data are calculated from cross correlations of measured capacitances, wherein the linearity of the pixel data calculations is utilised:

$$(P_{u,k} * P_{d,l})(t) = \frac{1}{T}\int_0^T P_{d,l}(s) P_{u,k}(t-s) ds$$

$$= \frac{1}{T}\int_0^T \sum_{j=1}^{28} b_{lj} C_{d,j}(s) \sum_{i=1}^{28} a_{ki} C_{u,i}(t-s) ds$$

$$= \frac{1}{T}\sum_{j=1}^{28} \sum_{i=1}^{28} b_{lj} a_{ki} \int_0^T C_{d,j}(s) C_{u,i}(t-s) ds$$

Therefore:

$$(P_{u,k} * P_{d,l})(t) = \sum_{j=1}^{28} \sum_{i=1}^{28} b_{lj} a_{ki} (C_{u,i} * C_{d,j})(t).$$

Thus, after calculating 28*28=784 cross correlations of all pairs of capacitances measured at the upstream and downstream sensors, all cross correlations of pixel data can be calculated therefrom by linear operations.

Using cross correlations of pixel data, various flow properties of a fluid can be determined. For example, a flow velocity profile can be determined. To determine a flow velocity profile, fluid transit times $\tau_{kl}(T)$ between image pixels $P_{u,k}$ at the upstream sensor and $P_{d,l}$ at the downstream sensor are determined by finding the maximum of the cross correlation between the respective pixel data as a function of time, $$\tau_{kl}(T) = \underset{0 \le t \le T_{max}}{\text{Max}} (P_{u,k} * P_{d,l})(t, T)$$

wherein $T_{max}$ is the maximum time window length for time correlation; and the other symbols have the same meaning as given before.

From the fluid transit times, a fluid flow velocity $v_{kl}$ between pixels $P_{u,k}$ and $P_{d,l}$ can be determined by $$v_{kl}(T) = \frac{L}{\tau_{kl}(T)},$$

wherein L is the distance between the upstream and downstream sensors, eventually corrected in order to take an actual distance between pixels into account; and the other symbols have the same meaning as given before.

The data set formed by all values of $v_{kl}$ (k,l=1, . . . , K) is referred to as a flow velocity profile. A subset of this flow velocity profile is the special flow velocity profile which is formed by all values of $v_{kl}$, wherein k=l, and k=1, . . . , K, which special flow profile represents the flow component that is parallel to the axis of the conduit.

If the fluid is a multi-component fluid, other flow properties of interest can be determined, if in addition to a flow velocity profile also an image of the fluid has been calculated. In the image, pixels can be ascribed to a single one of the components based on the value of the pixel data. By selecting all pixels that have been ascribed to a single component, together with a flow velocity profile the volumetric flow rate of that component can be determined. If the density of the component is known, also a mass flow rate of that component can be straightforwardly determined. It will be clear, that a volumetric flow rate and/or a mass flow rate can also be determined in case the fluid consists of only a single component.

Preferably, the capacitances $C_{u,i}$ and $C_{d,j}$ are measured in accordance with the method for providing corrected capacitances of the present invention.

The electrodes in the example of FIG. 1 are arranged on the outer surface 22 of the conduit, however, they may also be arranged in the conduit wall 24, or at the inner surface 26, and they may be covered by a protecting material (not shown). Preferably, all electrodes of an annular capacitance sensor have the same length in axial direction of the conduit. A capacitance meter may comprise additional components to those shown in FIGS. 1 and 2, for example additional annular capacitance sensors for selecting a different distance between upstream and downstream annular capacitance sensors, an electric screen, guard electrodes, dielectric filler material, data processing means, data communication means, power supply means, or a housing.

Now the calibration method in accordance with the present invention is discussed, and reference is made to the annular capacitance 2a of FIGS. 1 and 2. During normal operation of the annular capacitance sensor, the conduit 1 is filled with a fluid, wherein a dielectric property of the fluid is being determined based on capacitances measured by the annular capacitance sensor 2a. In the following, this fluid will be referred to as the test fluid. Normally, the test fluid will flow through the conduit. A set of measurement capacitors is selected, normally by selecting all 28 possible pairs of single sensor electrodes. The capacitance of a measurement capacitor formed by a pair of sensor electrodes is influenced by the dielectric properties of a fluid in the space that is probed by the pair of sensor electrodes. Further, the measured test capacitance is influenced by environmental influences.

To correct for the environmental influences a method of using an annular capacitance sensor advantageously comprises a calibration step in order to provide corrected test capacitances. To this end, according to the present invention the flow of the test fluid through the capacitance meter is interrupted, and the fluid is removed from the area that is probed by the annular capacitance sensor. This area is then filled with a calibration fluid with a known dielectric property, preferably with a homogeneous fluid having a homogeneous dielectric constant ∈. The calibration fluid can be a liquid or a gas, e.g. air, an inert gas, or a gas at decreased pressure ('vacuum').

Next, a set of calibration capacitors is selected. To this end, the eight sensor electrodes are subdivided into four consecutive sections [S1; S2; S3; S4], e.g. [(11a); (12a); (13a,14a,15a); (16a,17a,18a)]. Numbers between parentheses refer to those sensor electrodes in FIG. 1 that are part of the respective section. All sensor electrodes that belong to a particular section form, when interconnected, a calibration electrode. A first calibration capacitor is selected by selecting two non-neighbouring calibration electrodes. According to the above example, one calibration electrode is formed by the sensor electrode (11a), and the other calibration electrode is formed by the interconnected sensor electrodes (13a,14a,15a). A second calibration capacitor is selected to be formed by the remaining two calibration electrodes, i.e. (12a) and (16a,17a,18a). It will be clear, that and how other pairs of a first and a second calibration capacitor can be selected by using different subdivisions of the sensor electrodes into consecutive sections, e.g. [(11a,12a); (13a,14a); (15a,16a); (17a,18a)], or [(11a); (12a,13a); (14a,15a); (16a, 17a,18a)]. If the set consisting of all possible calibration capacitors is selected accordingly, it will be clear, that this set of calibration capacitors differs from the set of measurement capacitors.

For a selected pair of first and second calibration capacitors, a calibration capacitance $C_{c,1}$ of the first capacitor and a calibration capacitance $C_{c,2}$ of the second calibration capacitor is measured. If a plurality of pairs of first and second calibration capacitors is selected, a plurality of pairs $(C_{c,1}, C_{c,2})$ is measured.

The calibration capacitances are then converted to calibration capacitances per unit length by taking into account the length of the electrodes. For every such pair of calibration capacitances per unit length, a relationship based on the Thompson-Lampard theorem must hold. If known deviations from ideality can be accounted for, a modification of the Thompson-Lampard theorem is used. In a practical situation the (modified) Thompson-Lampard theorem will not be precisely fulfilled, due to environmental influences. Therefore, by measuring a plurality of pairs of calibration capacitances per unit length a system of equations is provided that are not precisely fulfilled. For this system of equations an optimal solution is determined. It may be advantageous to compare the optimal solution with optimal solutions that may have been determined during previous calibration steps, e.g. during an initial calibration step in the factory. Further, if there is sufficient symmetry in the size and arrangement of the calibration electrodes, the theorem may be reduced to the requirement that the both values of a pair of calibration capacitances must be equal to a certain value.

After all measurements of calibration capacitances have been performed, the calibration step can be finished. The calibration fluid is removed from the annular capacitance sensor and the conduit can again be filled with test fluid. The optimal solution that has been determined is subsequently used to determine the correction that is needed for test capacitances, that are measured by the annular capacitance sensor when filled with a test fluid. In particular, all capacitances $C_{u,i}$ and $C_{d,j}$ that are measured in a method for determining a flow property of the a fluid are with advantage corrected in this way.

A practical requirement that is for example relevant to the oil industry concerns the need for measurement devices that can be operated remotely in e.g. a wellbore or in a subsea installation. The present invention therefore also relates to a capacitance meter which comprises means for remote operation, which suitably includes means for telemetry and/or remote power supply. Telemetry is a specific aspect of remote operation, which is for example needed for control of the capacitance meter and for the data communication. The supply of the required power for the operation of the capacitance meter is another aspect of remote operation. It is often undesirable that a capacitance meter is provided with a cable that runs through the wellbore up to the surface. However, in a wellbore, telemetry and/or remote power supply can for example be provided via the casing and/or tubing that is arranged in the wellbore. To this end, the means for telemetry and/or remote power supply suitably comprises an inductive coupler which uses an alternating electromagnetic field for the transfer of data and/or electrical power between the capacitance meter and the casing or tubing. The capacitance meter may further comprise other electronic components, for example means for power regulation and storage, which can include a rechargeable battery or an ultracapacitor, a data processor, a controller or a communication interface.

What is claimed is:

1. A method for determining a flow property of a fluid flowing through a conduit provided with a capacitance meter comprising an upstream annular capacitance sensor, and a downstream annular capacitance sensor, wherein each annular capacitance sensor comprises at least three sensor electrodes, which sensor electrodes are arranged around the circumference of the conduit, the method comprising the steps of:

(a) selecting, for the annular capacitance sensor, a set of measurement capacitors, wherein a measurement capacitor is formed by two measurement electrodes, and wherein a measurement electrode consists either of a single sensor electrode or of at least two interconnected sensor electrodes;

(b) measuring a capacitance of each measurement capacitor characterized in that the annular capacitance sensor forms an upstream annular capacitance sensor, and in that the capacitance meter further comprises a downstream annular capacitance sensor provided with at least three sensor electrodes, which sensor electrodes are arranged around the circumference of the conduit, wherein the method further comprises the steps of (c) selecting, for the downstream annular capacitance sensor, a set of measurement capacitors;

(d) measuring at several moments during a time interval a capacitance of each measurement capacitor of each annular capacitance sensor;

(e) determining cross correlations between capacitances measured during the time interval at the upstream annular capacitance sensor and capacitances measured during the time interval at the downstream annular capacitance sensor; and (f) determining the flow property from the cross correlations using a linear operations.

2. A method according to claim 1, wherein the fluid comprises at least two fluid components, and wherein a fluid property of a fluid component is determined.

3. A method according to claim 1, wherein the flow property is one of a flow velocity profile over a cross-section of the conduit, a volumetric flow rate, or a mass flow rate.

4. A method according to claim 1, wherein the fluid comprises at least two components selected from the group of hydrocarbon oil, water, and natural gas.

5. A capacitance meter for determining a flow property of a fluid flowing through a conduit, the capacitance meter comprising an upstream and a downstream annular capacitance sensor arranged around the conduit, wherein each annular capacitance sensor comprises at least three sensor electrodes, which sensor electrodes are arranged around the circumference of the conduit, and wherein the capacitance meter is operated according to the method of claim 1.

6. A capacitance meter according to claim 5, which capacitance meter is suitable for usage subsea or in a wellbore in the earth in that it further comprises means for remote operation.

7. A capacitance meter according to claim 6, wherein the means for remote operation comprises means for telemetry or means for remote power supply.

8. A method according to claim 1, wherein the fluid is a test fluid, wherein each annular capacitance sensor comprises at least four sensor electrodes, and wherein the capacitances determined in step (b) are capacitances that have been corrected according to the method comprising the steps of:

filling the conduit with the test fluid;

selecting a set of measurement capacitors, wherein a measurement capacitor is formed by two measurement electrodes, and wherein a measurement electrode consists either of a single sensor electrode or of at least two interconnected sensor electrodes;

measuring a test capacitance of each measurement capacitor;

wherein the method further comprises the steps of interrupting the measurement at certain moments in time;

filing the conduit with a calibration fluid having a known dielectric property;

selecting a set of calibration capacitors, wherein a calibration capacitor is formed by two calibration electrodes, and wherein a calibration electrode consists either of a single sensor electrode or of at least two interconnected sensor electrodes;

measuring a calibration capacitance of each calibration capacitor; and determining corrected capacitances from the test capacitances and the calibration capacitances by using a relationship between the calibration capacitances and the known electric property of the calibration fluid.

9. A capacitance meter for determining a flow property of a fluid flowing through a conduit, the capacitance meter comprising an upstream and a downstream annular capacitance sensor arranged around the conduit, wherein each annular capacitance sensor comprises at least four sensor electrodes, which sensor electrodes are arranged around the circumference of the conduit, and wherein the capacitance meter is operated according to the method of claim 8.

10. A method for providing corrected capacitances using an annular capacitance sensor for determining a dielectric property of a test fluid in a conduit, which capacitance sensor comprises at least four sensor electrodes arranged around the circumference of the conduit, the method comprising the steps of:

filling the conduit with the test fluid;

selecting a set of measurement capacitors, wherein a measurement capacitor is formed by two measurement electrodes, and wherein a measurement electrode consists either of a single sensor electrode or of at least two interconnected sensor electrodes;

measuring a test capacitance of each measurement capacitor; wherein the method further comprises the steps of interrupting the measurement at certain moments in time;

filling the conduit with a calibration fluid having a known dielectric property;

selecting a set of calibration capacitors, wherein a calibration capacitor is formed by two calibration electrodes, and wherein a calibration electrode consists either of a single sensor electrode or of at least two interconnected sensor electrodes;

measuring a calibration capacitance of each calibration capacitor; and determining corrected capacitances from the test capacitances and the calibration capacitances by using a relationship between the calibration capacitances and the known electric property of the calibration fluid.

11. A method according to claim 10, wherein the step of selecting a set of calibration capacitors comprises the following steps selecting four calibration electrodes by subdividing the sensor electrodes around the circumference into four consecutive sections, wherein each section comprises either a single sensor electrode or at least two interconnected sensor electrodes and wherein each section forms a calibration electrode; and selecting a first and a second calibration capacitor, wherein the first calibration capacitor is formed by two non-neighbouring of the four calibration electrodes, and wherein the second calibration capacitor is formed by the remaining two calibration electrodes.

12. A method according to claim 11, wherein in the step of determining corrected capacitances a relationship between the calibration capacitance of the first calibration capacitor, the calibration capacitance of the second calibration capacitor, and the known dielectric property is used.

13. A method according to claim 12, wherein the relationship is the Thompson-Lampard theorem, or is based on a modification of the Thompson-Lampard theorem.

14. A capacitance meter for determining a dielectric property of a test fluid in a conduit, the capacitance meter comprising an annular capacitance sensor, which annular capacitance sensor comprises at least four sensor electrodes arranged around the circumference of the conduit, wherein the capacitance meter is calibrated according to the method of claim 10.

* * * * *